United States Patent
Wachtfogel et al.

(10) Patent No.: US 12,149,798 B2
(45) Date of Patent: Nov. 19, 2024

(54) CLOUD-BASED INPUT LATENCY MEASUREMENT

(71) Applicant: Synamedia Limited, Staines Upon Thames (GB)

(72) Inventors: Zorach Reuven Wachtfogel, Elazar (IL); Amotz Terem, Jerusalem (IL); Mordechai Regev, Lod (IL)

(73) Assignee: Synamedia Limited, Maidenhead (GB)

( * ) Notice: Subject to any disclaimer, the term of this patent is extended or adjusted under 35 U.S.C. 154(b) by 97 days.

(21) Appl. No.: 17/939,914

(22) Filed: Sep. 7, 2022

(65) Prior Publication Data

US 2024/0080533 A1 Mar. 7, 2024

(51) Int. Cl.
*H04N 21/482* (2011.01)
*H04N 21/81* (2011.01)
*H04N 21/845* (2011.01)
*H04N 21/8545* (2011.01)

(52) U.S. Cl.
CPC ......... *H04N 21/4821* (2013.01); *H04N 21/81* (2013.01); *H04N 21/8455* (2013.01); *H04N 21/8545* (2013.01)

(58) Field of Classification Search
CPC ......... H04N 21/47217; H04N 21/6125; H04N 21/4622; H04N 21/2368; H04N 21/25808
See application file for complete search history.

(56) References Cited

U.S. PATENT DOCUMENTS

| | | | |
|---|---|---|---|
| 8,902,248 B1 | 12/2014 | Bidarkar et al. | |
| 2010/0088726 A1* | 4/2010 | Curtis | G11B 27/034 725/45 |
| 2010/0161711 A1 | 6/2010 | Makhija et al. | |
| 2010/0162338 A1 | 6/2010 | Makhija et al. | |
| 2010/0228613 A1* | 9/2010 | Anderson | G06Q 30/02 705/14.13 |
| 2011/0075990 A1* | 3/2011 | Eyer | G11B 27/10 386/E5.003 |
| 2014/0259050 A1* | 9/2014 | Goldberg | H04N 21/43076 725/32 |
| 2015/0365498 A1 | 12/2015 | Agrawal et al. | |
| 2021/0394059 A1* | 12/2021 | Rajkumar | A63F 13/426 |

OTHER PUBLICATIONS

Extended European Search Report for corresponding European Appl. No. 23190414.5 dated Feb. 20, 2024.

* cited by examiner

*Primary Examiner* — Jason Salce (74) *Attorney, Agent, or Firm* — Fernando & Partners, LLP (57) ABSTRACT

Techniques for measuring cloud-based input latency are described herein. In accordance with various embodiments, a server including one or more processors and a non-transitory memory receives from a client an input event corresponding to a request for a TV user interface (UI). The server adds a tag to each of a set of screens corresponding to the TV UI and records event data corresponding to the input event prior to rendering the set of screens into a set of rendered frames. The server additionally decodes the tag in the set of rendered frames to generate metadata that associate the event data with the set of rendered frames prior to encoding the set of rendered frames into a set of encoded frames. The server also transmits to the client the set of encoded frames and the metadata.

20 Claims, 8 Drawing Sheets

CLOUD-BASED INPUT LATENCY MEASUREMENT

TECHNICAL FIELD

The present disclosure relates generally to cloud-based TV user interface rendering for media content streaming and, more specifically, to measuring end-to-end cloud-based TV user interface rendering latency.

BACKGROUND

The television industry is increasingly moving video processes away from client devices in millions of homes and moving such processes into the cloud. For cloud TV user interface (UI) rendering, typically, a client device receives a user input requesting a TV user interface and sends the input to the cloud. The cloud processes the input, renders it to a virtual screen, encodes the rendered screen using a low latency encoder, and sends the encoded UI video to the client device using a real time communication protocol. A critical requirement of cloud rendering is low end-to-end (E2E) latency, e.g., from the client pressing a key on an input device until displaying the results to the client. Currently, there is no direct way of measuring input lag or latency because there is no direct way of associating a client input with the corresponding video frame rendered in the cloud. Some previously existing solutions attempt to measure on the client side. Such client-based solutions often require special hardware and/or manual video analysis, thus are not practical for many low-cost client devices, e.g., thin clients.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

Methods, devices, and systems described herein capture client inputs in the cloud and tag such input events in cloud-rendered TV user interfaces (UIs) before sending tagged and encoded TV UIs to clients. In some embodiments, in response to receiving an input event from a client, e.g., a key press or a click, a tagger in the cloud prepares a virtual screen with a predefined color-coded message, e.g., a pixel in red or blue, and records the input event in an event store. Subsequently, a renderer in the cloud renders for the client in the virtual screen that has the tag. Further, in some embodiments, prior to encoding the rendered screen, a tag extractor in the cloud obtains the input event information from the event store and associates the input event with a frame corresponding to the input event, e.g., a frame for the UI or the first frame in a series of frames for the UI transition. Once an encoder, e.g., a low latency encoder in the cloud, encodes the rendered screen, in some embodiments, a metadata composer in the cloud generates metadata for the frame based on the association between the input event and the frame before the cloud streams the frame and the metadata to the client. When the client receives the frame, it can extract the metadata and measure the elapsed time between the client input time and the client receiving the cloud-generated UI. The methods, devices, and systems described herein thus utilize the resources in the cloud to reliably measure the input lag or latency without requiring client-side hardware or manual processing.

In accordance with various embodiments, a method of measuring cloud-based input latency is performed at a server including one or more processors and a non-transitory memory. The method includes receiving from a client an input event corresponding to a request for a TV user interface (UI). The method further includes adding a tag to each of a set of screens corresponding to the TV UI and recording event data corresponding to the input event prior to rendering the set of screens into a set of rendered frames. The method additionally includes decoding the tag in the set of rendered frames to generate metadata that associate the event data with the set of rendered frames prior to encoding the set of rendered frames into a set of encoded frames. The method also includes transmitting to the client the set of encoded frames and the metadata.

Example Embodiments

As described above, following the trend of moving TV user interface (UI) rendering into the cloud, techniques such as using a renderer in the cloud and then encoding the rendered output into a low latency video stream are used by the TV industry for cost savings. Also as described above, for cloud-based TV UI rendering, previously existing methods have no direct way of associating the client input with the corresponding cloud-rendered video frame. The methods, devices, and systems described herein insert tags before the cloud-based rendering and extract the tags after the cloud-based rendering to establish the association between the client input and the corresponding cloud-rendered video frame. Such association is then recorded in the header of the encoded frame. Consequently, using the techniques described herein, the cloud has control over the end-to-end (E2E) latency measurement by putting tags in the cloud and profiling along each part of the system, e.g., tagging the frame before rendering, decoding the tags after rendering, associating the event data with the frame based on the decoded tag information before encoding, and injecting metadata representing the association in the frame header in accordance with various embodiments.

Figure 1:
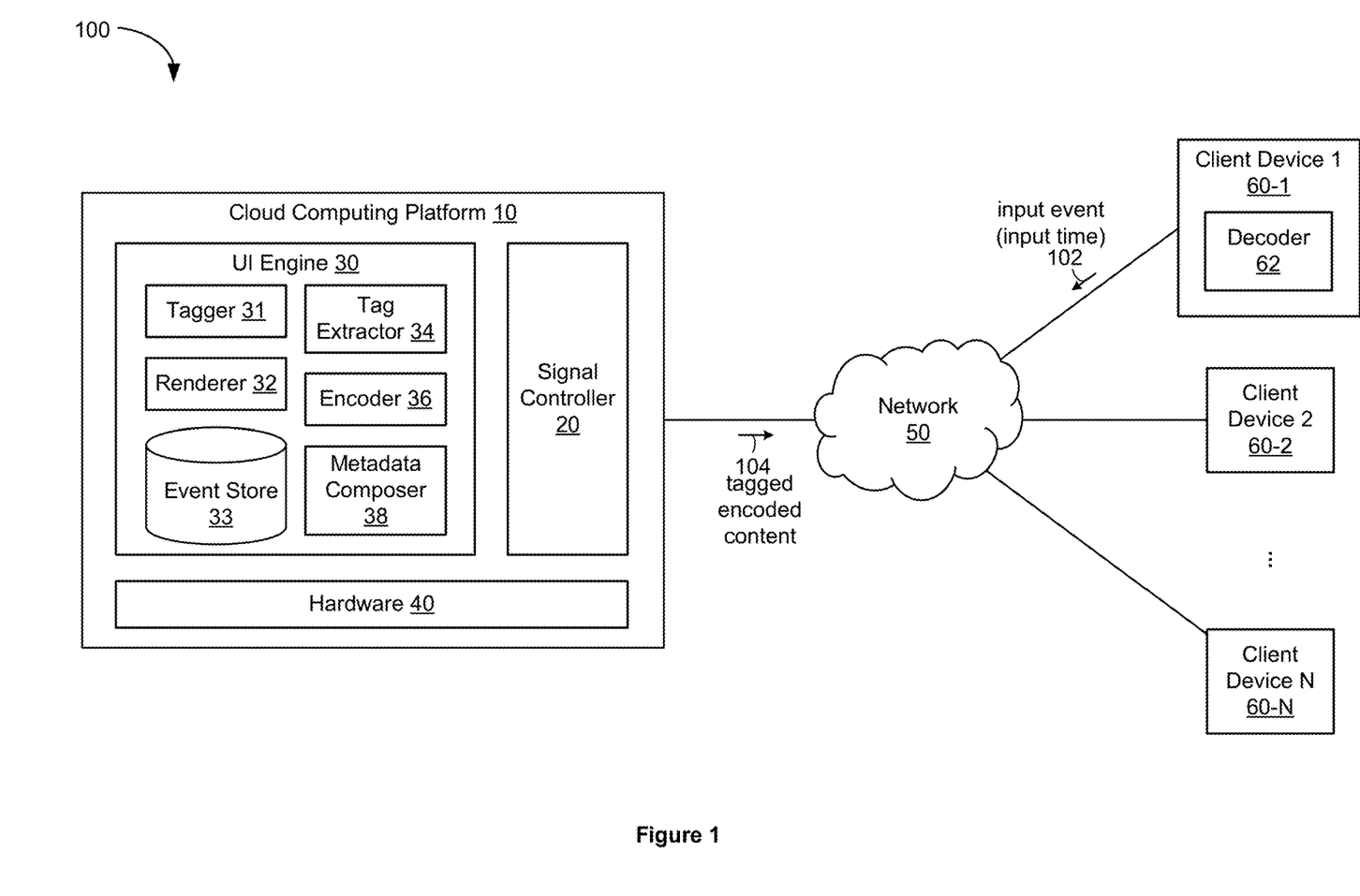
FIG. 1 is a block diagram of an exemplary media content delivery system with cloud-based TV user interface (UI) rendering, in accordance with some embodiments.

Reference is now made to FIG. 1, which is a block diagram illustrating an exemplary media content delivery system 100 with cloud-based UI rendering in accordance with some embodiments. The media content (also referred to hereinafter as "multimedia content", "media content item(s) ", or "content") can include any multimedia data, such as visual data, audio data, and/or text, etc. In some embodiments, the exemplary system 100 includes a cloud computing platform 10 that obtains media content, e.g., recorded content and/or live broadcast, and receives user inputs requesting cloud-rendered TV user interfaces (UIs), e.g., receiving an input event 102 from client device 1 60-1. In some embodiments, in response to receiving the user inputs, the cloud computing platform 10 renders TV UIs for the plurality of client devices 60, e.g., client device 1 60-1, client device 2 60-2, . . . , client device N 60-N, etc., and streams encoded content, including the cloud-rendered UIs, via a network 50 to the plurality of client devices 60. In some embodiments, the network 50 further includes a plurality of edge devices and/or content delivery networks (not shown) that bring computation and data storage closer to the plurality of client devices 60.

In some embodiments, the cloud computing platform 10 includes a signal controller 20 for establishing, maintaining, and tearing down connections and/or viewing sessions between the cloud computing platform 10 and the plurality of client devices 60. In some embodiments, to generate the encoded content for streaming, the cloud computing platform 10 includes a UI engine 20 (or a pool of UI engines) for generating cloud-rendered UIs in response to user inputs.

In some embodiments, the cloud computing platform 10 includes hardware 40, e.g., CPU(s) and/or GPU(s), for execution of UI rendering and/or content encoding programs and/or instructions. Though FIG. 1 illustrates a single UI engine 30, in some embodiments, the cloud computing platform 10 maintains a pool of UI engines and the signal controller 20. In such embodiments, each UI engine 30 runs as a virtual machine corresponding to one application for UI generation, and the virtual machines run on top of the hardware 40. An application as used herein refers to an executable program, or a listing of instructions for execution, that defines a UI or a virtual screen for display on a display device. With the UI engine 30 in the cloud, the cloud computing platform 10 runs multiple instances of applications for rendering TV UIs and serves as virtual set-top-boxes (STBs) for the plurality of client devices 60.

In some embodiments, when a client device 60, e.g., client device 1 60-1, detects an input event 102, client device 1 60-1 sends the information related to the input event 102 to the cloud computing platform, optionally via the network 50. Such information includes, for instance, the requested TV UI, the current screen, session information, and/or the input time, etc. On the cloud computing platform 10, the signal controller 20 receives the input event 102 over an established connection and/or session and forwards the input event 102 to the UI engine 30.

In some embodiments, the UI engine 30 includes a renderer 32 to render TV UI(s) in response to receiving the input event 102 forwarded by the signal controller 20. When the rendering is complete, a raw frame, e.g., a map of pixels, is generated. In some embodiments, the UI engine 30 also includes an encoder 36 to encode the raw frame and a metadata composer 38 to insert metadata into the encoded frame headers in preparation for streaming.

To enable the measurement of the cloud-based input latency, as will be described in further detail below with reference to FIG. 2, in some embodiments, the UI engine 30 includes a tagger 31, an event store 33, and a tag extractor 34 wrapped around the cloud-based UI rendering process, e.g., tagging and recording the input event before the rendering as well as extracting and decoding the tag and associating the tag with the input event after the rendering. Further, based on the tag in the raw frame and the associated input event information, the metadata composer 38 includes the input time in the corresponding encoded frame header. The cloud computing platform 10 then sends the tagged encoded content 104 to client device 1 60-1 for display, which enables the client device 1 60-1 to measure cloud-based input latency.

On the client side, in some embodiments, the client device 60 includes a decoder 62 that receives the tagged encoded content 104, obtains the input time from the frame header, and decodes the tagged encoded content 104 for display. The extraction of the metadata can be performed before or after the decoding process in accordance with various embodiments. Using the extracted input time, in some embodiments, the client device 60 measures the elapsed time between the input time and the current time to derive the cloud-based input latency. As such, from the tagged encoded content 104 prepared on the server-side, the client device 60 can measure the end-to-end (E2E) latency without extra hardware or manual video analysis on the client side.

Figure 2:
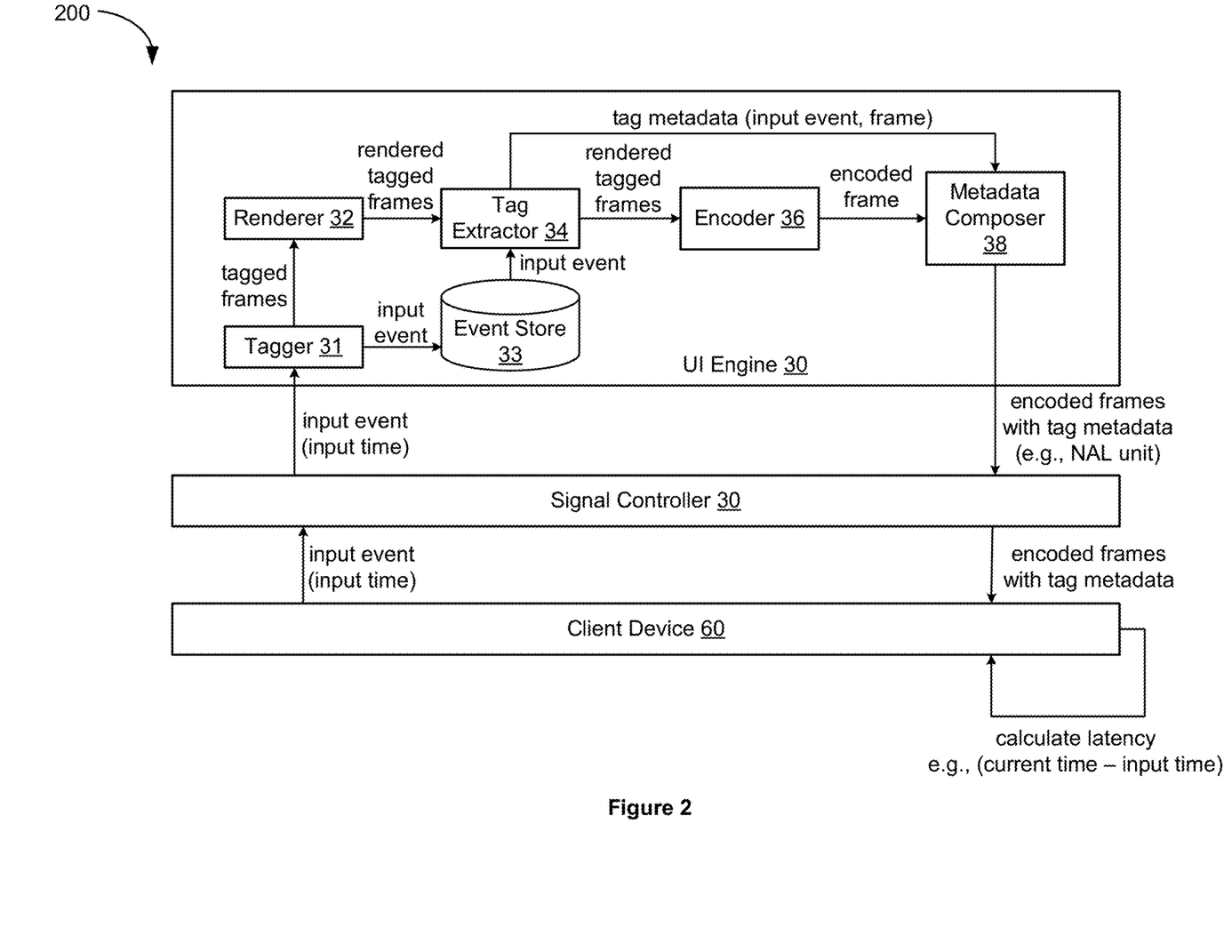
FIG. 2 is a diagram illustrating measuring end-to-end (E2E) cloud-based TV UI rendering latency, in accordance with some embodiments.

FIG. 2 is a diagram 200 illustrating measuring cloud-based TV UI rendering latency in accordance with some embodiments. In some embodiments, the cloud-based TV UI rendering process starts with the client device 60 detecting an input event, e.g., a click on a remote paired with the client device 60, and sending the information of the input event, e.g., with the input time as an attribute, to the signal controller 30. The signal controller 30, upon establishing a connection and/or a session, sends the input event information including the input time to the UI engine 30. In some embodiments, the tagger 31 is part of the application executing on top of the hardware 40 (FIG. 1), and the tagger 31 sets a predefined area on a virtual screen with a predefined color-coded message, e.g., a blue pixel or a red pixel. The tagger 31 then provides tagged frames to the renderer 32 so that the renderer 32 generates rendered tagged frames, e.g., rendered frames including the blue or red pixel. In some embodiments, instead of using a single pixel to represent the input event, the tagger 31 inserts more than one pixel in a predefined area of the screen and the coded color represents the input event identifier (ID). Further, in some embodiments, the predefined area is on-screen, while in some other embodiments, the predefined area is off-screen, e.g., not displayed on the display of the client device 60.

Figure 3A:
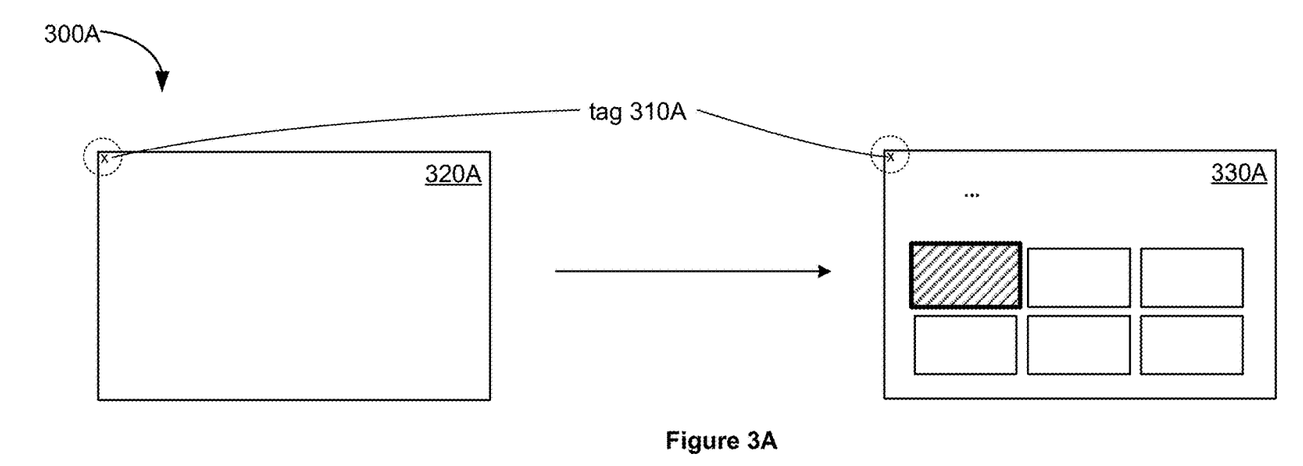
FIGS. 3A and 3B are diagrams illustrating drawing tags in predefined areas, in accordance with some embodiments.

For example, FIG. 3A is a diagram 300A illustrating drawing a tag in an on-screen predefined area. As shown in FIG. 3A, the tagger 31 (FIGS. 1 and 2) draws a tag 310A at the upper left corner of a screen 320A prior to the renderer 32 (FIGS. 1 and 2) renders a UI screen 330A, which includes the tag 310A at the upper left corner. The tag 310A is displayed along with TV UI elements, e.g., tiles in a content catalog UI with a tile being selected and highlighted. Because the tag is displayed as a single pixel on the screen 330A in accordance with some embodiments, which may or may not be discernable by a viewer, the display of the tag does not impact the user's viewing experience.

Figure 3B:
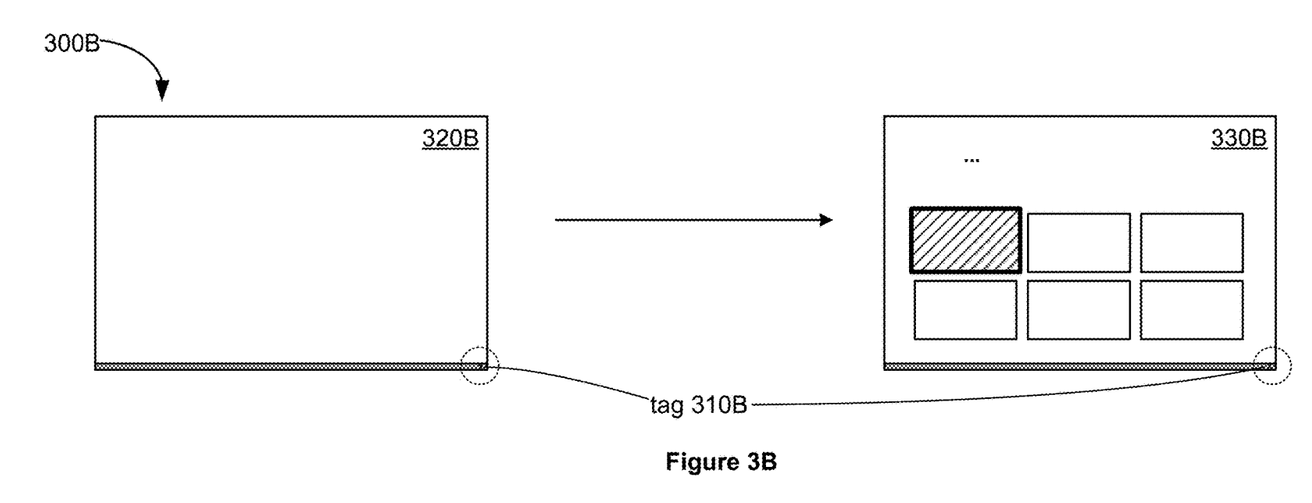

In another example, FIG. 3B is a diagram 300B illustrating drawing a tag in an off-screen predefined area. As shown in FIG. 3B, the tagger 31 (FIGS. 1 and 2) draws a tag 310B at the lower right corner of a screen 320B prior to the renderer 32 (FIGS. 1 and 2) renders a UI screen 330B, which includes the tag 310B on the lower right corner. The lower right corner is in an off-screen predefined area, e.g., along line 1084 in a 1080p screen, so that the off-screen predefined area, including the tag 310B, is not displayed on the display of the client device. As is known in the art, for 1080p resolution, the displayed screen has 1920*1080 pixels. To be able to encode the image, the resolution is divisible by 16. As such, during encoding, the screen 320B is divided into macro blocks of 16*16 pixels to receive a resolution of 1920*1088. In other words, the codec adds 8 lines at the bottom of the coded image, as shown in FIG. 3B, and such lines are removed and not displayed at the client side. Because such off-screen area including the tag is not displayed, having the tag on the screen 330B during cloud-based UI rendering does not impact the user's viewing experience.

Referring back to FIG. 2, in addition to tagging the frame in response to receiving the input event, the tagger 31 also records the input event in the event store 33. When the tag extractor 34 receives the rendered frames from the renderer 32 with the tags, e.g., intercepting the rendered frames from the renderer 32 to the encoder 36, the tag extractor 34 reads the predefined area of the screen and decodes the color-coded message. Further, the tag extractor 34 determines the association of the input event form the event store 33 to the frame, e.g., associating a respective input event to the first frame in a frame sequence rendered for the client device 60 in response to the input event. Once the association is established, the tag extractor 34 sends the tag metadata indicating the association to the metadata composer 38, so that once the encoder 36 encodes the rendered tagged frames into encoded frames, the metadata composer 38 inserts the input event information in the corresponding frame header.

Figure 4A:
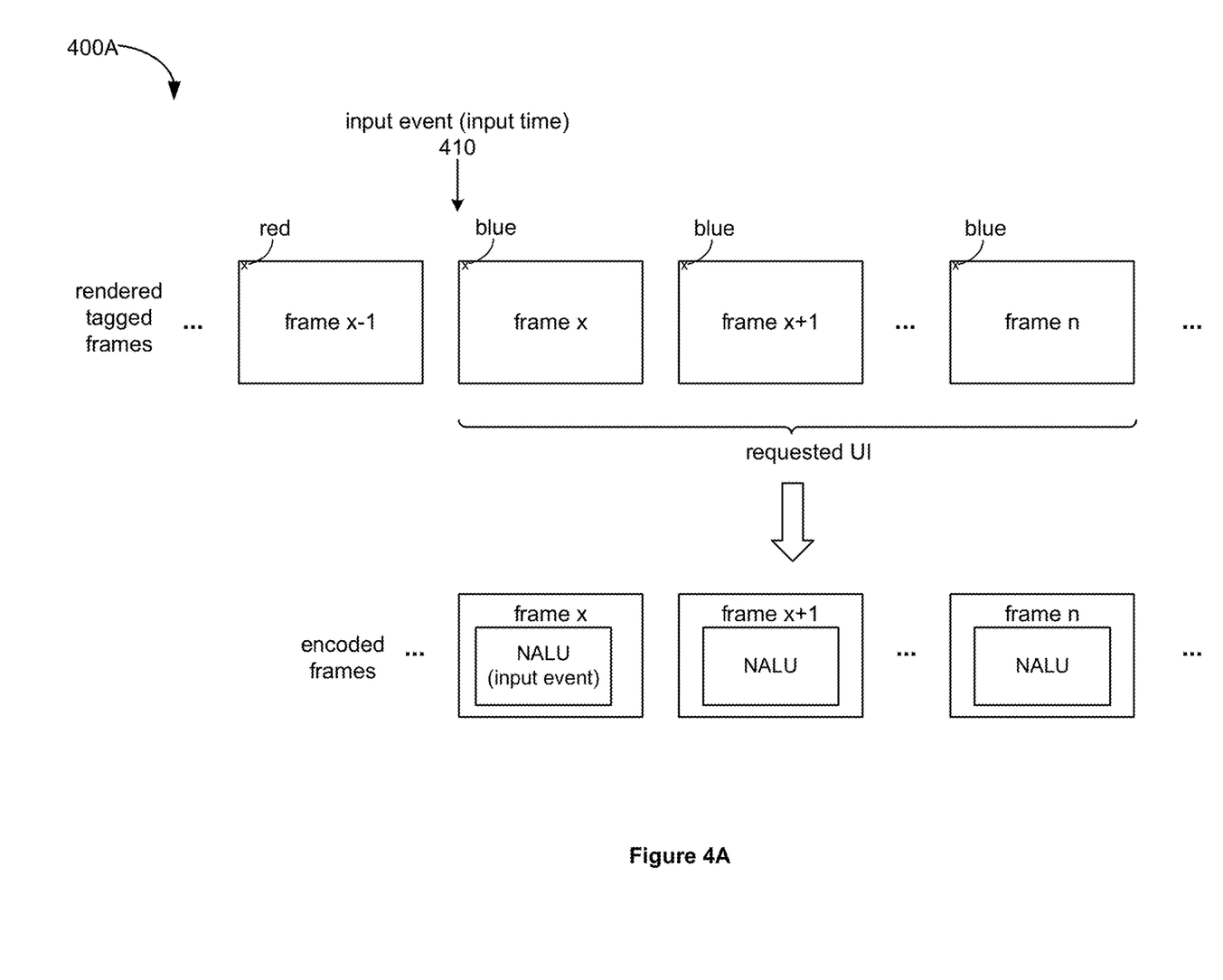
FIGS. 4A and 4B are diagrams illustrating using colored event tags for cloud-based input latency measurement, in accordance with some embodiments.

For example, FIG. 4A is a diagram 400A illustrating using two-color event tags for cloud-based input latency measurement in accordance with some embodiments. In some embodiments, the tagger (e.g., the tagger 31 in FIGS. 1 and 2) uses two predefined colors for the color-coded messages, e.g., red and blue in FIG. 4. Prior to receiving an input event 410, the tagger draws a pixel in red color in the rendered tagged frames, e.g., a red pixel in frame X−1. In response to receiving the input event 410, the tagger switches to a different color until the next input event, drawing a blue pixel in each of frame x, frame x+1, ..., frame n, etc. Further in response to receiving the input event 410, the tagger stores the information associated with the input event 410 in the event store (e.g., the event store 33 in FIGS. 1 and 2), where such information includes the input time in accordance with some embodiments. When the tag extractor (e.g., the tag extractor 34 in FIGS. 1 and 2) obtains the rendered tagged frames, the tag extractor detects the pixel color switch in the predefined area, e.g., from red in frame x−1 to blue in frame x, and retrieves the input event information from the event store to associate frame x with the input event 410. The tag extractor also notifies the metadata composer (e.g., the metadata composer 38 in FIGS. 1 and 2) of the association, so that as shown in FIG. 4A, the metadata composer inserts the input event information in the frame header of frame x, e.g., in the network abstraction layer (NAL) unit (NALU) according to H.264/H.265 video encoding standard.

In some embodiments, the tag extractor 34 pushes the metadata to the metadata composer 38 at the same time it pushes the rendered tagged frames to the encoder 36 for encoding. Further, the tag extractor 34 pushes the frames at a constant pace. Accordingly, because the encoder 36 takes time to encode the frames, by the time the frames are received by the metadata composer 38, the metadata have arrived before the frames and are ready to be inserted into the corresponding frame header. As such, the metadata generated by the tag extractor 34 that associate a respective raw rendered tagged frame with a respective input event can be used by the metadata composer 38 to insert the respective input event information into the header of the corresponding encoded frame.

In the example shown in FIG. 4A, the tagger uses the same color tag for each frame in the cloud-rendered UI, e.g., blue for frames x, x+1, ..., n. When the next input event arrives, the tagger switches to the other color, e.g., red, and uses red for each frame in the cloud-rendered UI until another input event arrives. In some embodiments, instead of using two-color tagging, the tagger toggles between more than two colors. Using more than two colors allows the system to distinguish the case where a new input event is received before the previous input event is processed and associated with a respective frame.

Figure 4B:
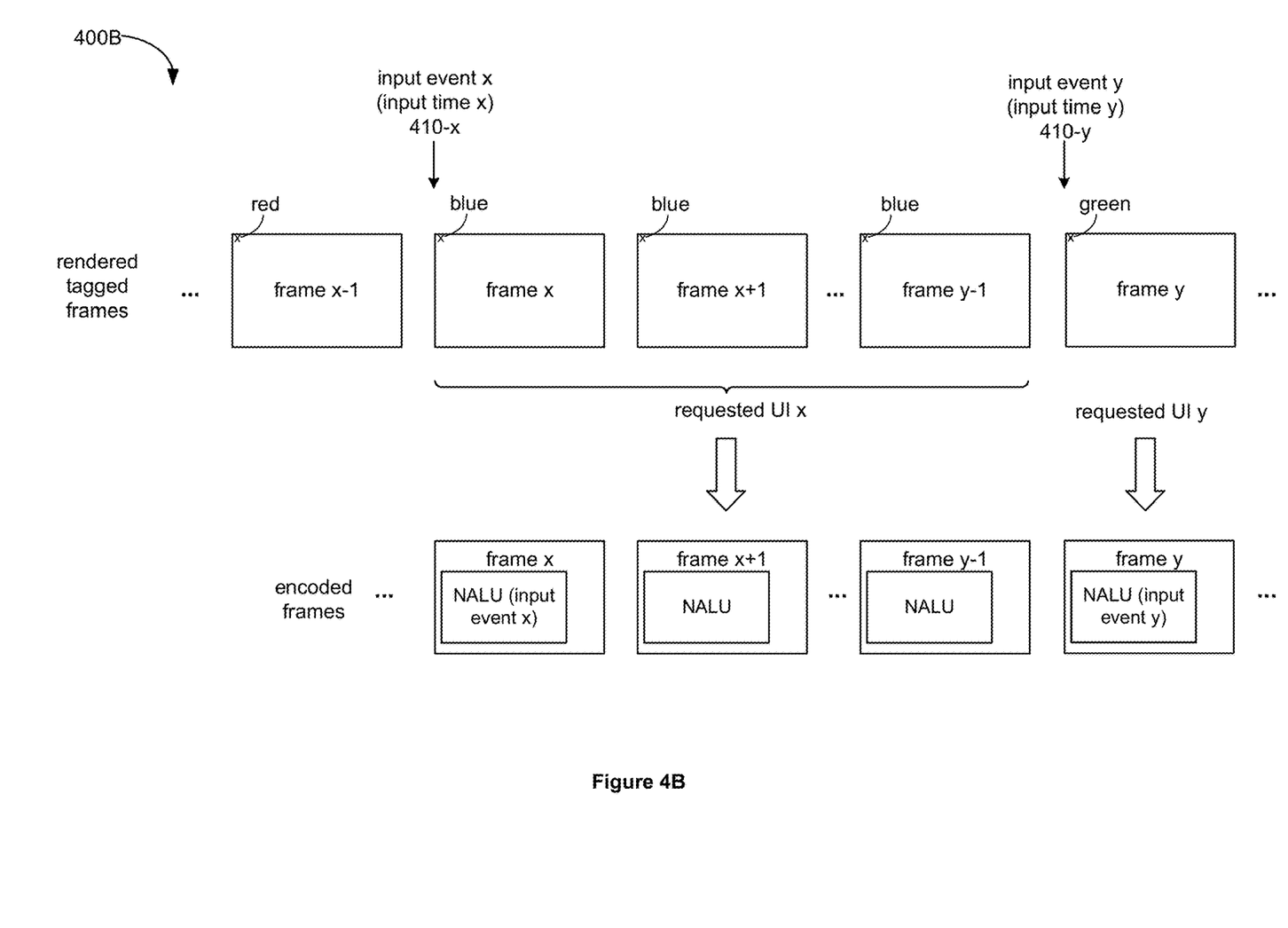

For example, FIG. 4B is a diagram 400B illustrating using three-color event tags for cloud-based input latency measurement in accordance with some embodiments. In FIG. 4B, the tagger rotates from red, e.g., frame x−1, to blue, e.g., frames x, x+1, ..., y−1, and then to green, e.g., frame y and so on. In particular, prior to receiving input event x 410-*x*, the tagger draws a pixel in red color in the rendered tagged frames including drawing a red pixel in frame x−1. In response to receiving input event x 410-*x*, the tagger draws a blue pixel in each of frame x, frame x+1, ..., frame y−1, and stores the information associated with the input event x 410-*x* in the event store (e.g., the event store 33 in FIGS. 1 and 2). Subsequently, in response to receiving input event y 410-*y*, the tagger draws a green pixel in frame y and stores the information associated with the input event y 410-*y* in the event store.

When the tag extractor (e.g., the tag extractor 34 in FIGS. 1 and 2) obtains the rendered tagged frames, the tag extractor detects the pixel color switch in the predefined area, e.g., from red in frame x−1 to blue in frame x or from blue in frame y−1 to green in frame y. Upon detecting the changes in color, the tag extractor retrieves the input event information from the event store to associate frame x with input event x 410-*x* and associated frame y with input event y 410-*y*, respectively. The tag extractor also notifies the metadata composer (e.g., the metadata composer 38 in FIGS. 1 and 2) of the associations, so that as shown in FIG. 4B, the metadata composer inserts the input event information in the frame header (e.g., an NAL unit) of frame x and frame y, respectively.

Having more than two colors for tagging the rendered frames ensures that the frames are associated with the proper input events for cloud-based input latency measurement. In the system as shown in FIG. 2, once the tagger 31 provides the input event information to the renderer 32 and the rendering process is started, e.g., executed on the hardware

40 (FIG. 1), the UI engine 30 waits for the renderer 32 to complete the rendering process. Once the rendering is completed, the tag extractor 34 receives raw frames with pixels, where each raw frame includes the colored pixel drawn by the tagger 31 in the predefined area. In the case of two input events happening one right after the other, e.g., two fast clicks, it is possible that the frame(s) rendered for the second input event are outputted by the renderer 32 before the frame(s) for the first input event, e.g., outputting frame y before frame x in FIG. 4B. In such scenario, using two tags, e.g., switching between red and blue, the tag extractor 34 may not be able to detect the color switch, e.g., both frame x−1 and frame y would be tagged red. In contrast, using more than two colors, the tag extractor 34 would be able to identify the color change from red to green. Moreover, knowing the color rotation sequence of red-blue-green, the tag extractor 34 would be able to obtain the proper input event from the event store 33 and make the association, e.g., associating input event y with frame y in the example shown in FIG. 4B.

It should be noted that though FIGS. 4A and 4B illustrate using 2-color and 3-color rotation for tagging, respectively, the system described herein can use any number of colors bounded by pixel depth. As the system uses more colors used in the rotation for tagging, the system can handle consecutive input events that are closer to each other, e.g., faster consecutive clicks with shorter duration for each click. For example, assuming the expected time between two consecutive input events is denoted as TBC, e.g., time between clicks, and the rendering speed is denoted as FPS, e.g., frames per second, the minimum number of required colors for tagging, e.g., denoted as MNC, can be calculated based on the expected time between two consecutive input events and the rendering speed, e.g., MNC=1+1/(FPS*TBC). For instance, in the case of the renderer rendering 25 frames per second and the expected time between two clicks of a user is 20 ms, at least 3 colors are required for the tagging, e.g., 1+1/(25*0.02)=3.

Referring back to FIG. 2, In some embodiments, the UI engine 30 described herein dynamically adjust the tagging schemes, e.g., using a different color rotation pattern, different number of colors, and/or different number of pixels. For example, the UI engine 30 can use less number of colors for tagging when the rendering speed is fast enough, e.g., rendering simple UIs and/or having access to sufficient time slices of the hardware 40 for rendering. In another example, the UI engine 30 can increase the number of colors for tagging when the rendering speed is low, e.g., rendering complex UI transitions and/or having a busy GPU.

In some embodiments, once the client device 60 receives the encoded frames with tag metadata, the client device 60 extracts the tag metadata from the frame header when obtaining the first frame of the rendered TV UI. The client device 60 can then utilize the input time, which is included as part of the tag metadata, to calculate the cloud-based input latency based on the current time.

Figure 5A:
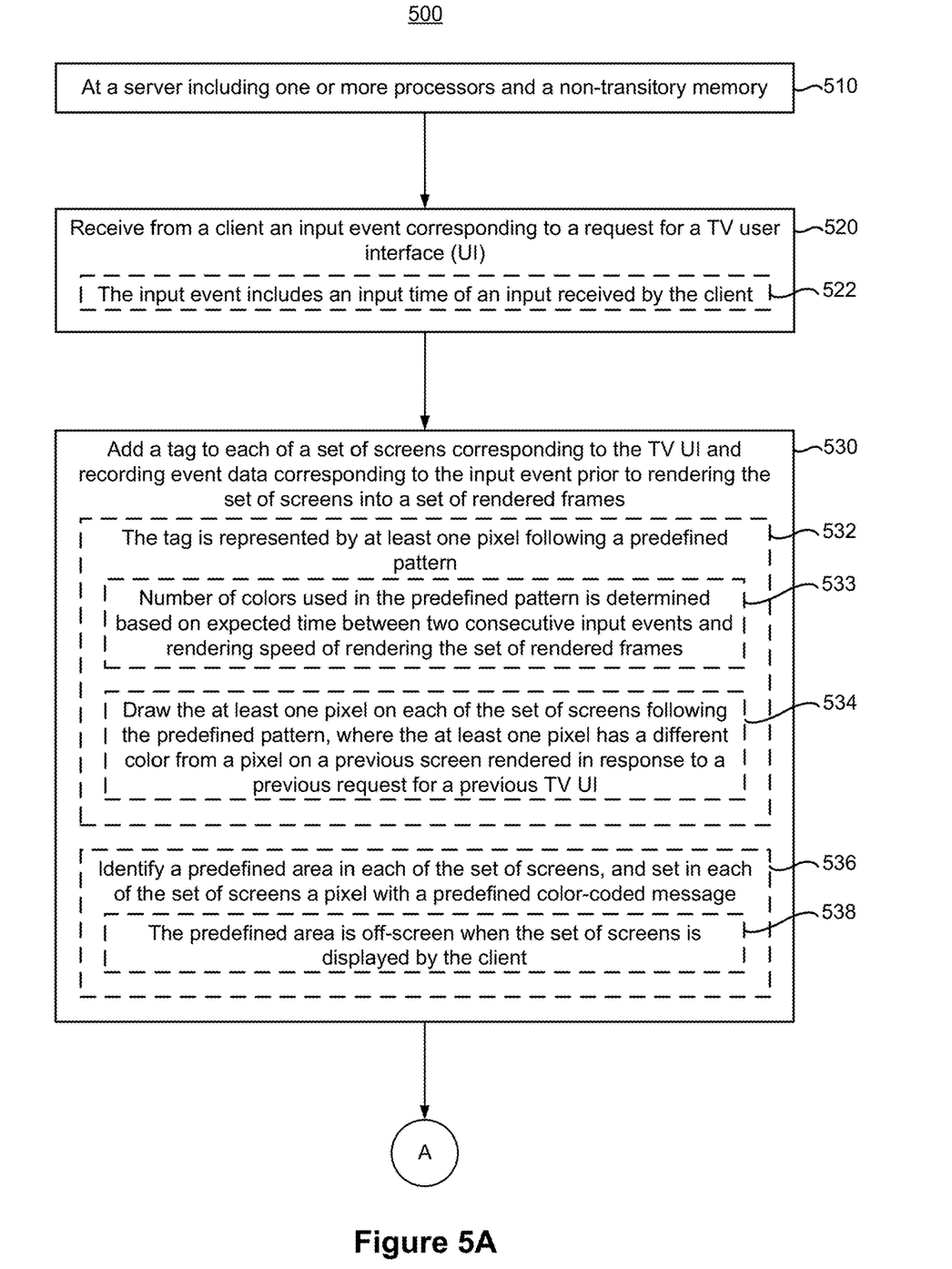
FIGS. 5A and 5B are flow diagrams illustrating a method of measuring cloud-based input latency, in accordance with some embodiments.
Figure 5B:
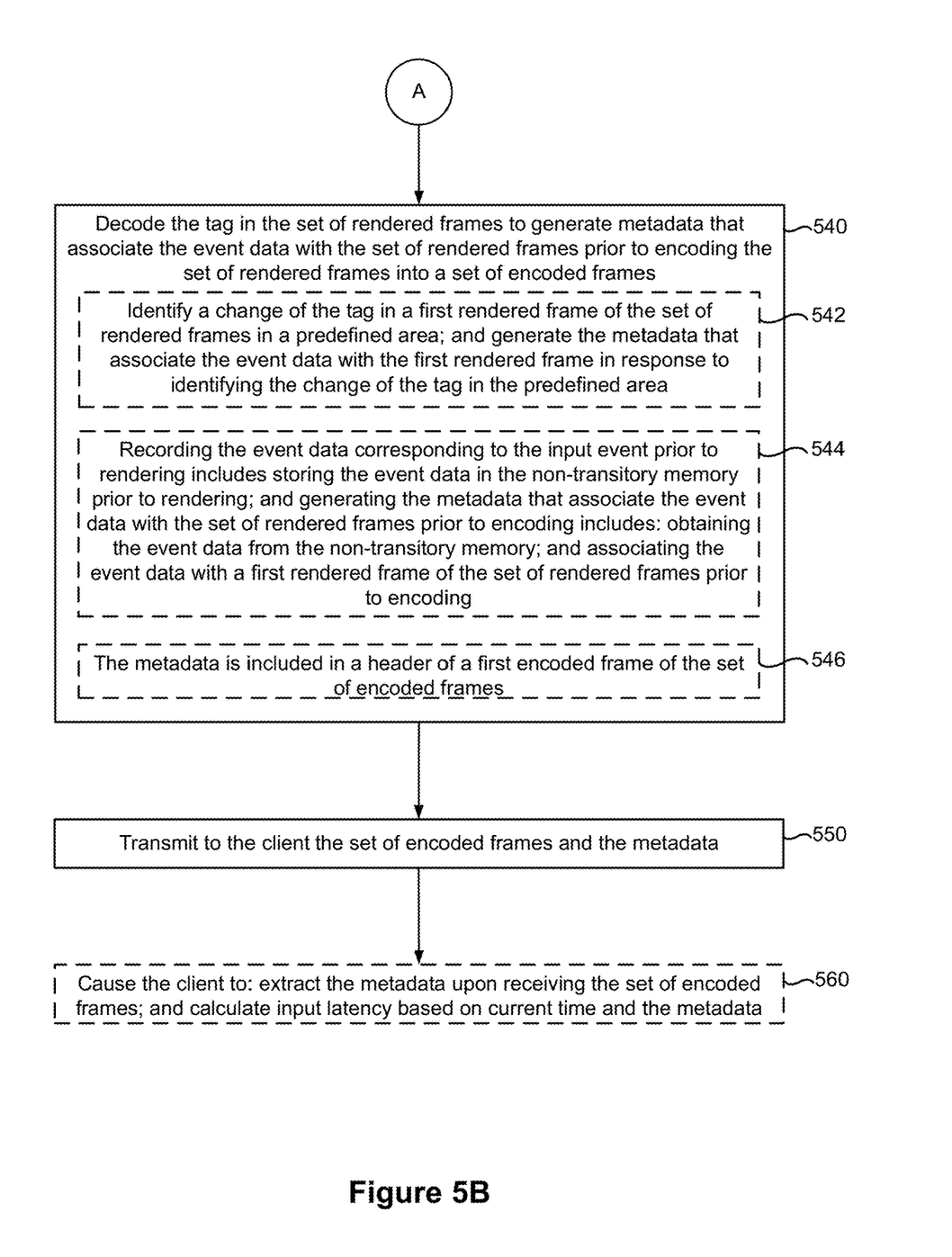

FIGS. 5A and 5B are flow diagrams illustrating a method 500 for measuring cloud-based input latency in accordance with some embodiments. As represented by block 510 in FIG. 5A, in some embodiments, the method 500 is performed at a server that includes one or more processors and a non-transitory memory, e.g., the server hosting the cloud computing platform 10 including the signal controller 20, the UI engine 30, and the hardware 40 with the hardware 40 being the one or more processors and/or the non-transitory memory in FIG. 1. The method 500 begins with the UI engine receiving from a client an input event corresponding to a request for a TV user interface (UI), as represented by block 520. In some embodiments, as represented by block 522, the input event includes an input time of an input received by the client.

For example, in FIG. 1, client device 1 60-1 sends the input event 102 corresponding to a request for a TV UI to the cloud computing platform 10, e.g., selecting a highlighted tile in a content catalog as shown in FIGS. 3A and 3B or pressing an arrow key on a TV remote to scroll the tiles in the content catalog. Further as shown in FIG. 2, the signal controller 30 forwards such input event to the UI engine 30. Also as shown in FIGS. 1 and 2, the input event data sent by the client device 60 can include an input time of the input received by the client device 60, e.g., the input time of pressing a button on the TV remote paired with the client device 60 or the input time of tapping on a touch screen display of the client device 60.

The method 500 continues with the UI engine, e.g., the tagger 31 in FIGS. 1 and 2, adding a tag to each of a set of screens corresponding to the TV UI and recording event data corresponding to the input event prior to rendering the set of screens into a set of rendered frames, as represented by block 530. For example, as shown in FIG. 2, prior to the renderer 32 rendering requested TV UIs for the client device 60, the tagger 31 generates tagged frames and records the input event in the event store 33.

In some embodiments, as represented by block 532, the tag is represented by at least one pixel following a predefined pattern. In such embodiments, as represented by block 533, number of colors used in the predefined pattern is determined based on expected time between two consecutive input events and rendering speed of rendering the set of rendered frames in accordance with various embodiments. Also in such embodiments, as represented by block 534, adding the tag to each of the set of screens corresponding to the TV UI includes: drawing the at least one pixel on each of the set of screens following the predefined pattern, where the at least one pixel has a different color from a pixel on a previous screen rendered in response to a previous request for a previous TV UI in accordance with various embodiments.

For example, as shown in FIG. 4A, the tag in each of the rendered tagged frames is represented by one pixel and the tagging follows a predefined red-blue color rotation pattern, such that the pixel color switches from red to blue in response to receiving the input event 410 at frame x and the same blue pixel is used for tagging frames x, x+1, n until the next input event. Also in FIG. 4A, the 2-color rotation pattern may be sufficient when the rendering speed is expected to be 25 frames per second and the time between two consecutive input events is 40 ms, e.g., 1+1/(25*0.04)=2. In another example, as shown in FIG. 4B, the tag in each of the rendered tagged frames is represented by one pixel and the tagging follows a predefined red-blue-green color rotation pattern. Also as shown in FIG. 4B, the 3-color rotation pattern may be sufficient when the rendering speed is expected to be 25 frames per second and the time between two consecutive input events is 20 ms, e.g., 1+1/(25*0.02)=3. Though not shown, in some embodiments, the tag can be represented by multi-colored pixels corresponding to an input event ID.

As represented by block 536, in some embodiments, adding the tag to each of the set of screens corresponding to the TV UI includes: identifying a predefined area in each of the set of screens; and setting in each of the set of screens a pixel with a predefined color-coded message. Further in such embodiments, as represented by block 538, the predefined area is off-screen when the set of screens is displayed by the client in accordance with various embodiments. For example, in FIG. 3A, the tagger identifies the upper left corner of the screen 320A as the predefined area and sets a red pixel. In another example, in FIG. 3B, the tagger identifies the lower bottom corner of the screen 320B as the predefined area and sets a blue pixel. In FIG. 3B, the blue pixel is located in an off-screen area, e.g., line 1084 in a 1080 screen, such that the blue pixel is not displayed by the client.

Turning to FIG. 5B, the method 500 continues, with the UI engine, e.g., the tag extractor 34 in FIGS. 1 and 2, decoding the tag in the set of rendered frames to generate metadata that associate the event data with the set of rendered frames prior to encoding the set of rendered frames into a set of encoded frames, as represented by block 540. For example, in FIG. 2, prior to encoding the frames by the encoder 36, the tag extractor 34 decodes tags from the rendered tagged frames and generates the tag metadata by associating the event data obtained from the event store with the rendered tagged frames.

In some embodiments, as represented by block 542, decoding the tag in the set of rendered frames to generate the metadata that associate the event data with the set of rendered frames prior to encoding the set of rendered frames into the set of encoded frames includes: identifying a change of the tag in a first rendered frame of the set of rendered frames in a predefined area; and generating the metadata that associate the event data with the first rendered frame in response to identifying the change of the tag in the predefined area. For example, in FIG. 4A, the tag extractor detects the color change in the upper left corner of the screen from red in frame x−1 to blue in frame x. In response to identifying the change, the tag extractor generates the tag metadata that associate the input event 410 with frame x and sends the tag metadata to the metadata composer 38 as shown in FIG. 2. In another example, in FIG. 4B, the tag extractor detects the color changes in the upper left corner of the screen from red in frame x−1 to blue in frame x and then from blue in frame y−1 to green in frame y. In response to identifying the changes, the tag extractor generates the tag metadata that associate input event x 410-x with frame x and associate input event y 410-y with frame y.

In some embodiments, as represented by block 544, recording the event data corresponding to the input event prior to rendering includes storing the event data in the non-transitory memory prior to rendering; and generating the metadata that associate the event data with the set of rendered frames prior to encoding includes: obtaining the event data from the non-transitory memory; and associating the event data with a first rendered frame of the set of rendered frames prior to encoding. As represented by block 546, metadata is included in a header of a first encoded frame of the set of encoded frames.

For example, in FIG. 2, the tagger 31 can store the last input event such as a key press in the event store, e.g., as a variable. Also as shown in FIG. 2, when preparing the association, the tag extractor 34 obtains the last input event from the event store 33, e.g., from the variable, for the association between the input event and the frame. As shown in FIGS. 4A and 4B, the association is between the input event and the first rendered tagged frame, e.g., associating input event 410 with frame x in FIG. 4A, associating input event x 410-x with frame x in FIG. 4B, or associating input event y 410-y with frame y in FIG. 4B. According to the associations, when the frames leave the encoder, the first encoded frame of the requested UI is tagged with the input event information, e.g., including the input event information in the NAL unit of frame x in FIG. 4A, including input event x information in the NAL unit of frame x in FIG. 4B, or including input event y information in the NAL unit of frame y in FIG. 4B.

Still referring to FIG. 5B, as represented by block 550, the method 500 continues with the cloud computing platform transmitting to the client the set of encoded frames and the metadata, e.g., sending the tagged encoded content 104 generated by the UI engine 30 to the client device 60 shown in FIG. 1. In some embodiments, as represented by block 560, the method 500 further includes causing the client to: extract the metadata upon receiving the set of encoded frames; and calculate input latency based on current time and the metadata. For example, as shown in FIG. 2, when the client device 60 receives the encoded frames with tag metadata, the client device 60 can measure the elapsed time since the input event time.

Figure 6:
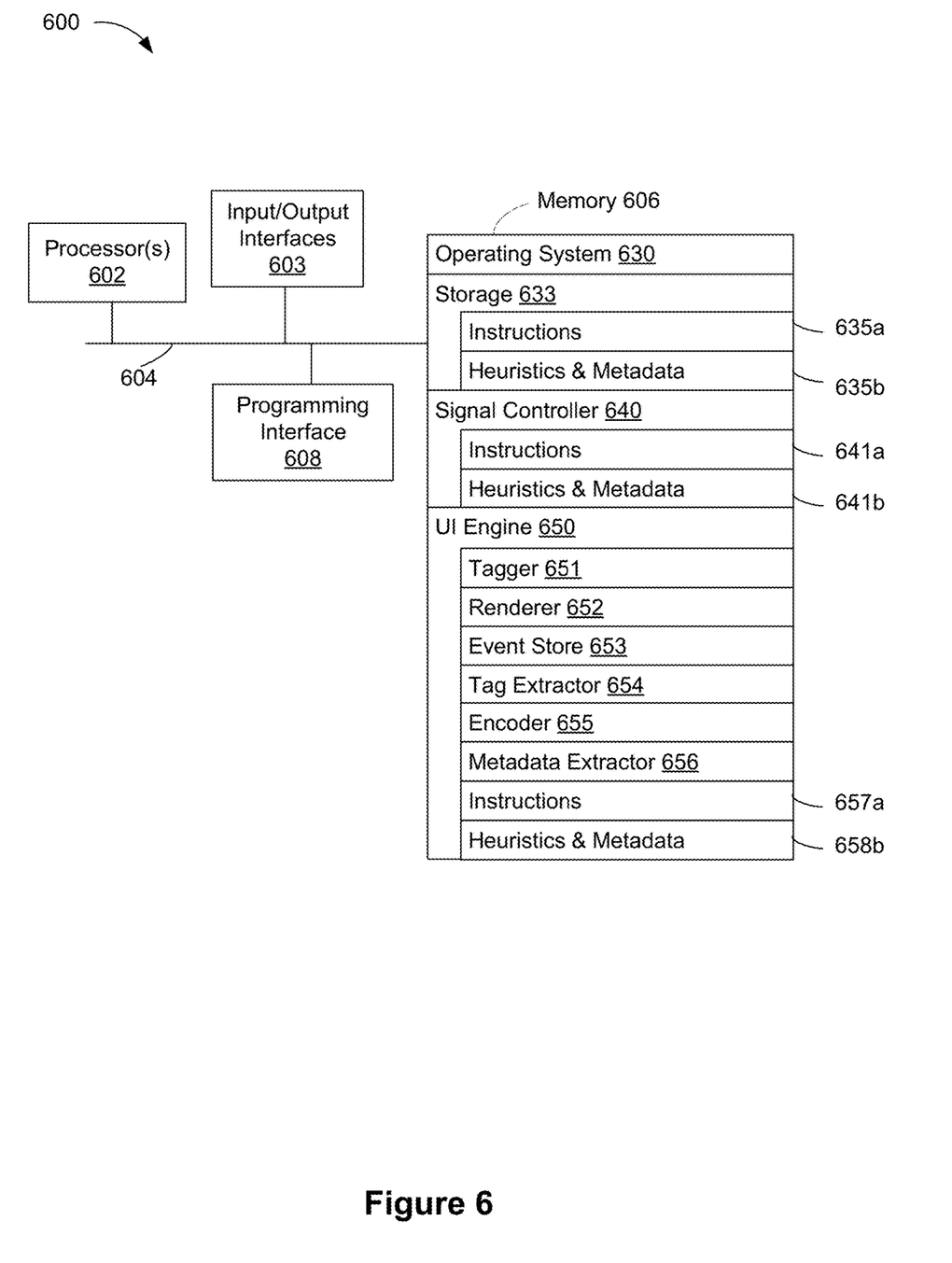
FIG. 6 is a block diagram of a computing device for facilitating cloud-based input latency measurement, in accordance with some embodiments.

FIG. 6 is a block diagram of a computing device 600 for facilitating the measurement of cloud-based input latency in accordance with some embodiments. In some embodiments, the computing device 600 performs one or more functions of one or more servers hosting the cloud computing platform 10 (FIG. 1) and performs one or more of the functionalities described above with respect to the server(s). While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units 602 (e.g., processor(s) including CPU and/or GPU as part of the hardware 40 in FIG. 1), one or more input/output interfaces 603 (e.g., input devices, sensors, a network interface, a display, etc.), a memory 606 (e.g., also as part of the hardware 40 in FIG. 1), a programming interface 608, and one or more communication buses 604 for interconnecting these and various other components.

In some embodiments, the communication buses 604 include circuitry that interconnects and controls communications between system components. The memory 606 includes high-speed random access memory, such as DRAM, SRAM, DDR RAM or other random access solid state memory devices; and, in some embodiments, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some embodiments, the memory 606 or the non-transitory computer readable storage medium of the memory 606 stores the following programs, modules and data structures, or a subset thereof including an optional operating system 630, a storage module 633, a signal controller 640, and a UI engine 650. In some embodiments, one or more instructions are included in a combination of logic and non-transitory memory. The operating system 630 includes procedures for handling various basic system services and for performing hardware dependent tasks.

In some embodiments, the storage module 633 stores data related to media content delivery. To that end, the storage module 633 includes a set of instructions 635a and heuristics and metadata 635b.

In some embodiments, the signal controller 640 (e.g., the signal controller 20 in FIG. 1) is configured to maintain connections and/or sessions between the cloud platform and client devices. To that end, the signal controller 640 includes a set of instructions 641*a* and heuristics and metadata 641*b*.

In some embodiments, the UI engine 650 (e.g., the UI engine 30 in FIGS. 1 and 2) is configured to generate and provide cloud-rendered UI to client devices. In some embodiments, the UI engine 650 further includes a tagger 651 (e.g., the tagger 31, FIGS. 1 and 2) for tagging virtual screens in response to receiving client inputs, a renderer 652 (e.g., the renderer 32, FIGS. 1 and 2) for rendering UIs for client devices in the tagged virtual screen, an event store 653 (e.g., the event store 33, FIGS. 1 and 2) for receiving input event information from the tagger 651 and storing the input events, a tag extractor 654 (e.g., the tag extractor 34, FIGS. 1 and 2) for extracting and decoding the tags from the rendered UIs generated by the renderer 32 and retrieving the input event information from the event store 653 for association, an encoder 655 (e.g., the encoder 36, FIGS. 1 and 2) for encoding the rendered tagged frames outputted by the renderer 652, and a metadata extractor 656 (e.g., the metadata extractor 38, FIGS. 1 and 2) for adding metadata to the headers of the encoded frames outputted by the encoder 655 representing the association provided by the tag extractor 654. To that end, the UI engine 650 includes a set of instructions 657*a* and heuristics and metadata 657*b*.

Although the storage module 633, the signal controller 640, and the UI engine 650 are illustrated as residing on a single computing device 600, it should be understood that in other embodiments, any combination of the storage module 633, the signal controller 640, and the UI engine 650 can reside on separate computing devices. For example, in some embodiments, each of the storage module 633, the signal controller 640, and the UI engine 650 resides on a separate computing device.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
    at a server including one or more processors and a non-transitory memory:
    receiving from a client an input event corresponding to a request for a TV user interface (UI);
    adding a tag represented by at least one pixel following a predefined pattern to each of a set of screens corresponding to the TV UI and recording event data corresponding to the input event prior to rendering the set of screens into a set of rendered frames, wherein number of colors used in the predefined pattern is determined based on expected time between two consecutive input events and rendering speed of rendering the set of rendered frames;
    decoding the tag in the set of rendered frames to generate metadata that associate the event data with the set of rendered frames prior to encoding the set of rendered frames into a set of encoded frames; and
    transmitting to the client the set of encoded frames and the metadata.

2. The method of claim 1, wherein the input event includes an input time of an input received by the client.

3. The method of claim 1, wherein adding the tag to each of the set of screens corresponding to the TV UI includes:
    drawing the at least one pixel on each of the set of screens following the predefined pattern, wherein the at least one pixel has a different color from a pixel on a previous screen rendered in response to a previous request for a previous TV UI.

4. The method of claim 1, wherein adding the tag to each of the set of screens corresponding to the TV UI includes:
drawing the tag in a predefined area in each of the set of screens.

5. The method of claim 4, wherein the predefined area is off-screen when the set of screens is displayed by the client.

6. The method of claim 1, wherein decoding the tag in the set of rendered frames to generate the metadata that associate the event data with the set of rendered frames prior to encoding the set of rendered frames into the set of encoded frames includes:
identifying a change of the tag in a first rendered frame of the set of rendered frames in a predefined area; and
generating the metadata that associate the event data with the first rendered frame in response to identifying the change of the tag in the predefined area.

7. The method of claim 1, wherein:
recording the event data corresponding to the input event prior to rendering includes storing the event data in the non-transitory memory prior to rendering; and
generating the metadata that associate the event data with the set of rendered frames prior to encoding includes:
obtaining the event data from the non-transitory memory; and
associating the event data with a first rendered frame of the set of rendered frames prior to encoding.

8. The method of claim 1, wherein the metadata is included in a header of a first encoded frame of the set of encoded frames.

9. The method of claim 1, further comprising, causing the client to:
extract the metadata upon receiving the set of encoded frames; and
calculate input latency based on current time and the metadata.

10. A server comprising:
one or more processors;
a non-transitory memory;
a network interface; and
one or more programs, stored in the non-transitory memory, which, when executed by the one or more processors, cause the server to:
receive, via the network interface, from a client an input event corresponding to a request for a TV user interface (UI);
add a tag represented by at least one pixel following a predefined pattern to each of a set of screens corresponding to the TV UI, including drawing the at least one pixel on each of the set of screens following the predefined pattern, wherein the at least one pixel has a different color from a pixel on a previous screen rendered in response to a previous request for a previous TV UI, and recording event data corresponding to the input event prior to rendering the set of screens into a set of rendered frames;
decode the tag in the set of rendered frames to generate metadata that associate the event data with the set of rendered frames prior to encoding the set of rendered frames into a set of encoded frames; and
transmit, via the network interface, to the client the set of encoded frames and the metadata.

11. The server of claim 10, wherein the input event includes an input time of an input received by the client.

12. The server of claim 10, wherein number of colors used in the predefined pattern is determined based on expected time between two consecutive input events and rendering speed of rendering the set of rendered frames.

13. The server of claim 10, wherein adding the tag to each of the set of screens corresponding to the TV UI includes:
drawing the tag in a predefined area in each of the set of screens.

14. The server of claim 13, wherein the predefined area is off-screen when the set of screens is displayed by the client.

15. The server of claim 10, wherein decoding the tag in the set of rendered frames to generate the metadata that associate the event data with the set of rendered frames prior to encoding the set of rendered frames into the set of encoded frames includes:
identifying a change of the tag in a first rendered frame of the set of rendered frames in a predefined area; and
generating the metadata that associate the event data with the first rendered frame in response to identifying the change of the tag in the predefined area.

16. A non-transitory memory storing one or more programs, which, when executed by one or more processors of one or more servers, cause the one or more servers to:
receive from a client an input event corresponding to a request for a TV user interface (UI);
add a tag to each of a set of screens corresponding to the TV UI, including drawing the tag in a predefined area in each of the set of screens, wherein the predefined area is off-screen when the set of screens is displayed by the client, and recording event data corresponding to the input event prior to rendering the set of screens into a set of rendered frames;
decode the tag in the set of rendered frames to generate metadata that associate the event data with the set of rendered frames prior to encoding the set of rendered frames into a set of encoded frames; and
transmit to the client the set of encoded frames and the metadata.

17. The non-transitory memory of claim 16, wherein the input event includes an input time of an input received by the client.

18. The non-transitory memory of claim 16, wherein the tag is represented by at least one pixel following a predefined pattern.

19. The non-transitory memory of claim 18, wherein number of colors used in the predefined pattern is determined based on expected time between two consecutive input events and rendering speed of rendering the set of rendered frames.

20. The non-transitory memory of claim 18, wherein adding the tag to each of the set of screens corresponding to the TV UI includes:
drawing the at least one pixel on each of the set of screens following the predefined pattern, wherein the at least one pixel has a different color from a pixel on a previous screen rendered in response to a previous request for a previous TV UI.

* * * * *